United States Patent [19]
Haase et al.

[11] Patent Number: 5,296,213
[45] Date of Patent: Mar. 22, 1994

[54] POLYMERIC ALUMINUM SILICATE-SULPHATE AND PROCESS FOR PRODUCING SAME

[75] Inventors: Dieter Haase, St. Constant, Canada; Robert M. Christie, Burnham, Great Britain; Carmel Jolicoeur, Deauville; Denis Pothier, Boisbriand, both of Canada

[73] Assignee: Handy Chemicals Limited, La Prairie, Canada

[21] Appl. No.: 929,023

[22] Filed: Aug. 13, 1992

[51] Int. Cl.$^5$ .................. C01B 33/26; C01B 7/74; C01B 33/20
[52] U.S. Cl. .................. 423/326; 423/327.1; 423/556
[58] Field of Search .................. 423/327.1, 556, 328.1, 423/326

[56] References Cited

U.S. PATENT DOCUMENTS

| | | |
|---|---|---|
| 2,310,009 | 2/1943 | Baker et al. |
| 2,999,734 | 9/1961 | Weber et al. |
| 3,535,259 | 10/1970 | Horioka |
| 3,963,640 | 6/1976 | Smith |
| 4,024,087 | 5/1977 | Lainer et al. |
| 4,122,031 | 10/1978 | Smith |
| 4,252,735 | 2/1981 | Layer et al. |
| 4,284,611 | 8/1981 | Gancy et al. |
| 4,333,795 | 6/1982 | Street |
| 4,536,384 | 8/1985 | Lindahl |
| 4,563,342 | 1/1986 | Gunnarsson et al. |
| 4,566,986 | 1/1986 | Waldemann |
| 4,877,597 | 10/1989 | Haase et al. |
| 4,911,790 | 3/1990 | Lindstrom et al. |
| 4,981,675 | 1/1991 | Haase et al. |
| 5,069,893 | 12/1991 | Haase et al. |
| 5,076,940 | 12/1991 | Boutin et al. |
| 5,149,400 | 9/1992 | Haase et al. |

FOREIGN PATENT DOCUMENTS

| | | |
|---|---|---|
| 1123306 | 5/1982 | Canada. |
| 1203364 | 4/1986 | Canada. |
| 1203664 | 4/1986 | Canada. |
| 1203665 | 4/1986 | Canada. |
| 0110847 | 6/1984 | European Pat. Off. |
| 2018129 | 10/1970 | Fed. Rep. of Germany. |
| 2228895 | 12/1972 | Fed. Rep. of Germany. |

OTHER PUBLICATIONS

Patent Abstracts of Japan, vol. 1, No. 17, (C-76)(920), 1976, & JP-A-51-132195, Nov. 17, 1976, Kazuo Hoshi, et al., "Process for Production of Soluble Basic Aluminum Salt".

Derwent Publications, Ltd., SU 1006-377-A, Mar. 23, 1983, "Coagulant Prepn.—By Composing Aluminum Hydroxide Suspension with Sulphuric Acid, with Controlling Molar Ratio and Stirring Rate".

Primary Examiner—Wayne Langel
Attorney, Agent, or Firm—Oblon, Spivak, McClelland, Maier & Neustadt

[57] ABSTRACT

The invention relates to basic polynucleate aluminum hydroxy silicate sulfate compounds and to a process for their preparation. The process involves first mixing an alkali metal silicate and an alkali metal aluminate solution and optionally a third component under continuous stirring to form an alkaline intermediate mixture and slowly adding the resulting alkaline intermediate mixture to an acidic aluminum sulfate solution under high shear mixing conditions. Compared to processes of the prior art, the present invention leads directly to solution products having higher $Al_2O_3$ concentrations. Moreover, the products prepared through this invention exhibit enhanced stability over time, and improved performance in flocculation-coagulation application.

23 Claims, 2 Drawing Sheets

POLYMERIC ALUMINUM SILICATE-SULPHATE AND PROCESS FOR PRODUCING SAME

BACKGROUND OF THE INVENTION

I. Field of the Invention

The present invention relates to basic polynucleate aluminum hydroxy silicate sulfate (PASS) compounds and to a process for their preparation.

II. Description of the Prior Art

These compounds act as flocculants, coagulating agents, precipitating agents, dewatering agents and clarifiers useful in industries such as water treatment, pulp and paper, or wherever an aluminum hydroxide gel system resulting from such polymeric compounds can be employed.

Compounds of this type, processes for their production, and specific uses are disclosed in U.S. Pat. No. 4,981,675, issued on Jan. 1, 1991, U.S. Pat. No. 5,069,893 issued on Dec. 3, 1991 and U.S. Pat. No. 5,149,400 issued on Sep. 22, 1992 (from patent application Ser. No. 07/601,374 filed Oct. 23, 1990), all assigned to the same assignee as the present application. The disclosures of these patents are specifically incorporated herein by reference.

While these compounds and processes are effective and useful, there is still room for improvement both in the form in which the compounds are prepared and in their processes of preparation.

SUMMARY OF THE INVENTION

It is therefore an object of the present invention to provide a novel family of basic polynucleate aluminum hydroxy silicate sulfate compounds and novel processes for producing the same.

One embodiment of the invention comprises mixing a silicate into an alkaline reactant to form an alkaline premix or intermediate mixture. This alkaline premix is then introduced or injected into an acidic component under high shear conditions to form stable basic polynucleate silicate-containing compounds. The alkaline component may comprise one or more alkaline salts such as alkali metal aluminate, alkali metal zincate, alkali metal zirconate, bicarbonates, borates, carbonates, acetates etc. The acidic component may be selected from one or more salts of aluminum, iron, zirconium, etc. for example aluminum sulfates, halides or nitrates, ferric sulfate, halide, or nitrate, ferrous sulfate, halide or nitrate, etc.

More particularly, the present invention provides a process for producing polynucleate basic aluminum hydroxy silicate sulfates having an average chemical composition indicated by the formula:

$$Al_A(OH)_B(SO_4)_C(SiO_x)_D(H_2O)_E$$

wherein:
- A is the number 1.0;
- B is a number from 0.75 to 2.0;
- C is a number from 0.30 to 1.12;
- D is a number from 0.005 to 0.1;
- x is a number greater than 2 but less than or equal to 4, such that $3 = B + 2C + 2D(x-2)$; and
- E is a number representing both bound and free water and is greater than 8 for products in solution form and less than 8 for products in solid form.

The product has a basicity defined by $B/3A \times 100$ in the range of 25–66%. Up to 10 molar % of the amount of Al indicated in the formula above may be replaced by an equivalent amount of another multi-valent cation and up to 10 molar % of the amount of sulfate anion indicated in the formula above may be replaced by another anion. Moreover, the product may contain up to 10 molar % (referring to Al) of a weak acid, or of a salt thereof, to achieve one or more of the following: increase the ease of product preparation, enhance the stability of the product, or improve its performance in applications.

The process of the invention preferably involves mixing an alkali metal silicate and a concentrated alkali metal aluminate in water to form an alkaline intermediate mixture and adding the alkaline intermediate mixture to an acidic aluminum sulfate solution under high shear mixing conditions. If desired, up to 10 molar % of the aluminum sulfate may be replaced by an equivalent amount of at least one water-soluble compound containing ions selected from a multi-valent cation other than aluminum, an anion other than sulfate, and both of such multi-valent cation and such anion. Up to 10 molar % of at least one weak organic or inorganic acid or salt of a weak organic or inorganic acid may also be provided in at least one of the intermediate mixture, the aluminum sulfate solution and the aqueous polynucleate hydroxy aluminum silicate sulfate solution.

The invention relates to the solution produced as above and to a dried product produced by drying the solution.

DETAILED DESCRIPTION OF THE INVENTION

Figures 1, 2:
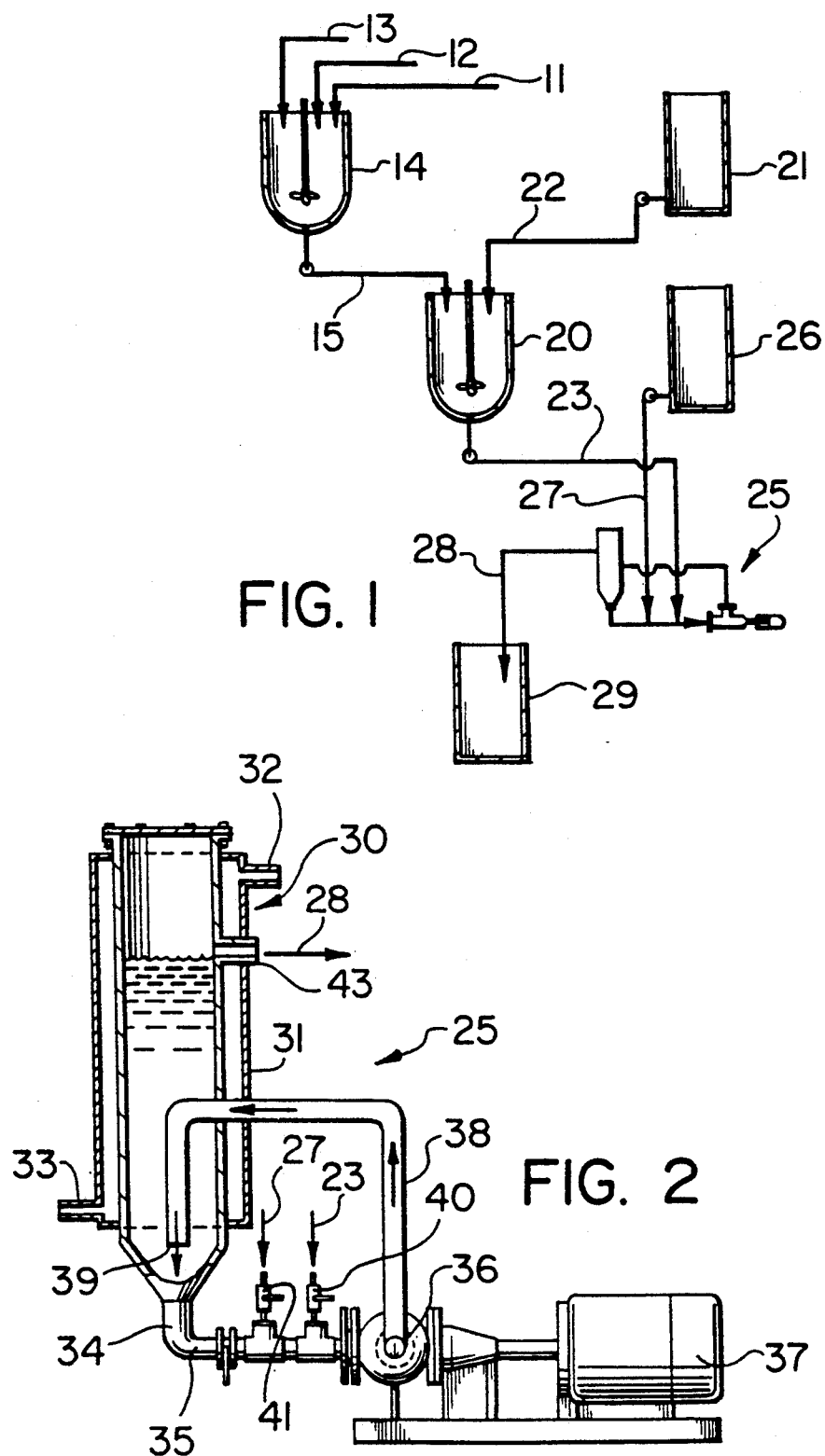
FIG. 1 is a flow diagram illustrating in general terms a preferred continuous process according to one aspect of the present invention.
FIG. 2 is a side elevation, partially in cross-section, of a high shear mixer apparatus for carrying out the process of the invention.

The process of producing polynucleate aluminum hydroxy silicate sulfate solutions disclosed in U.S. Pat. No. 4,981,675 and the other related patents mentioned above involves the following steps (see, for example, lines 12 to 26 of Column 4 and claim 7 in Column 10 of U.S. Pat. No. 4,981,675). Firstly an alkali metal silicate solution is mixed into an aluminum sulfate solution to form an acidic intermediate mixture. An alkaline alkali metal aluminate solution is then slowly introduced into and reacted with the acidic intermediate mixture under high shear mixing conditions. The resulting aqueous aluminum hydroxy silicate sulfate solution contains the equivalent of about 7–10% by weight of alumina (see lines 37 to 41, Column 4 of U.S. Pat. No. 4,981,675) and it is not possible by this process to form substantially more concentrated solutions without resorting to subsequent concentration by water removal.

In contrast, the process of the present invention in its most basic form involves first mixing an alkali metal silicate into an alkali metal aluminate solution under continuous stirring to form an alkaline intermediate mixture, and slowly adding the resulting alkaline intermediate mixture to an acidic aluminum sulfate solution under high shear mixing conditions.

The change in mixing sequence relative to the previous patent (i.e. the silicate into the aluminate, rather than into the aluminum sulfate) allows one to prepare an alkaline mixture which is clear and stable at high $Al_2O_3$ content, typically greater than 16% $Al_2O_3$, and which can be successfully introduced into aluminum sulfate, or alum, under high shear mixing. Hence, the indicated reversal of mixing order unexpectedly and surprisingly makes it possible to produce more concentrated solutions (i.e. solutions having greater $Al_2O_3$ content) than those of prior disclosures. The sequences used in the prior art results in more water being present at the time of the mixing with of the silicate with the aluminum sulfate, which prevents a more concentrated product being formed. For example, it is possible by means of the process of the present invention to produce clear and stable solutions containing up to 11% by weight equivalent alumina. This increased concentration allows subsequent dilutions to produce stable product solutions containing lesser amounts of product, e.g. down to 7% equivalent $Al_2O_3$ by weight. In addition to minimizing transportation costs, the more concentrated solutions also make it more economical to produce a solid product from the solution since less water has to be removed. There is also less decomposition of the product by hydrolysis because of the shorter drying times required.

The solution produced by the process of the invention is also more active when used for its intended applications than the solutions produced by the above mentioned prior patents and is thus more effective and desirable. For example, when used for the reduction of water turbidity, the solution according to the present invention can achieve the same effect as the product of the above patents when used in approximately half the amount. Moreover, the product is more effective in warm water, as well as cold, thus making the product application less sensitive to variations in climate.

The alternative mixing procedure of the present invention is also more convenient than the process of the prior patents because the alumino-silicate-containing intermediate mixture produced as above has a stability of at least one week. This overcomes production problems encountered as a result of the instability of the sulfate-silicate intermediate mixture of the prior processes, namely that the mixture undergoes gelling after just a few hours. The new mixing procedure allows the homogenization of an alkaline aluminate solution (intermediate alkaline mixture) containing 16% $Al_2O_3$, or more, in comparison with a solution containing 10.8% $Al_2O_3$ produced by the process of U.S. Pat. No. 4,981,675.

It is also preferable in the present invention to add one or more salts of weak acids, or the acid itself, either to the alkaline intermediate mixture or to the acidic aluminum sulfate solution prior to the high shear mixing step, or even to the final product solution after the high shear mixing step. Alkali, alkaline earth or ammonium salts of any weak organic acid, such as carboxylic acids and/or polyfunctional hydroxy acids such as acetates, oxalates, tartrates, citrates, gluconates; or alkali, alkaline earth or ammonium salts of any weak inorganic acid, such as carbonates, bicarbonates, borates, mono- and di-hydrogen phosphates, etc. are suitable for use in the invention. Sodium carbonate and bicarbonate are preferred because of their inexpensiveness and ready availability. The presence of such a salt provides increased reactivity of the intermediate solution with the aluminum sulfate, increased final product stability and improved performance of the final product.

Without wishing to be bound by a particular theory, it is believed that the process of the present invention is capable of producing more concentrated solutions because of the greater reactivity of the intermediates formed during the addition of the alkaline intermediate mixture into aluminum sulfate under high shear. A likely explanation of the enhanced reactivity of the intermediate may be advanced by analogy with known phenomena in the chemistry and structures of glasses. In silicate (or borosilicate glasses), various oxides (e.g., $Na_2O$, CaO) are known to modify the network formed by the connected silicate or (boro-silicate) species. The presence of silicate ions in the aluminate premix may exert a similar "network modifying" role, changing the structure of the $Al(OH)_3$ gel which is temporarily formed when the aluminate is introduced into the acidic alum solution. Hence, the gel does not grow into large unreactive particles but, instead, continues to react with the other solution species to form the soluble basic polynucleate aluminum compounds. Other salts of weak acids, for example sodium carbonate or bicarbonate, introduced in the aluminate solution or in the alkaline intermediate mixture may exert a similar role, further facilitating the formation of the final product.

When the salt or a corresponding weak acid is to be present in the intermediate mixture, it can be dissolved directly into the intermediate mixture during or after its formation, or more preferably it can be dissolved in the silicate solution or the aluminate solution prior to the use of these solutions in the formation of the intermediate solution.

The following sequences of addition of the reactants are examples embodiments of the process falling within the scope of the invention, using sodium carbonate as an example of the optional salt of a weak acid:

a. Add sodium carbonate followed by sodium silicate to water and add the resulting premix to sodium aluminate solution to form an intermediate mixture and, under high shear mixing conditions, introduce the intermediate mixture into an aluminum sulfate solution.

b. Add sodium silicate followed by sodium carbonate (as a solid or in solution) to water to form a premix, add the premix to sodium aluminate solution to form an intermediate mixture and, under high shear, inject the intermediate mixture into an aluminum sulfate solution.

c. Add sodium silicate to water and add the resulting solution to sodium aluminate solution to form an intermediate mixture; add sodium carbonate in the form of a solid or in solution to aluminum sulfate solution; and, under high shear mixing conditions, inject the intermediate mixture into the aluminum sulfate solution.

d. Add sodium silicate to water and, add the resulting solution to sodium aluminate to form the intermediate mixture; and under high shear mixing conditions inject the intermediate mixture into an aluminum sulfate solution, and then add sodium carbonate in solid form or in solution.

e. As in d., but without adding the sodium carbonate.

f. Add sodium silicate to water, add the resulting solution to sodium aluminate solution to form an intermediate mixture, add sodium carbonate to the mixture and then, under high shear mixing conditions, inject the resulting intermediate mixture into aluminum sulfate solution.

The product of the present invention is especially useful for the treatment of potable waters and waste waters, for the production of paper and in the dewatering of pulps or sludges.

Having explained the invention and its advantages in general terms, the invention, and presently preferred embodiments thereof, will now be described in greater detail.

THE PRODUCT

The process described above enables the production of a family of compounds, having average chemical compositions represented by the following formula in which the stoichiometric coefficients are normalized relative to Al:

$$Al_A(OH)_B(SO_4)_C(SiO_x)_D(H_2O)_E$$

wherein:
A is the number 1.0;
B is a number from 0.75 to 2.0;
C is a number from 0.30 to 1.12;
D is a number from 0.005 to 0.1;
x is a number greater than 2 but less than or equal to 4 such that $3 = B + 2C + 2D(x-2)$; and
E is a widely variable number representing both bound and free water, and is usually greater than 8 for products in solution form and less than 8 for products in solid form.

Furthermore, the product has a basicity, defined by $$B/3A \times 100$$

in the range of 25-66%, preferably 40-60%, and more preferably 45-55%.

Preferably, in the above representational formula:
$B = 1.2-1.8$
$C = 0.53-0.90$
$D = 0.033-0.070$
$x \leq 3$;
and more preferably:
$B = 1.35-1.65$
$C = 0.66-0.81$
$D = 0.04$
$x = 2.3$.

The solution may also contain up to 10 molar %, based on the amount of Al, of water soluble compounds of at least one multi-valent cation selected from iron, magnesium, calcium, zinc and zirconium, replacing an equivalent amount of the Al in the formula above. Such cations may be introduced by replacing part of the aluminum sulfate with the equivalent amount of a sulfate salt of the above-listed cations.

The solution may further contain up to 10 molar %, based on the sulfate anion, of water soluble compounds of at least one additional anion selected from phosphate, acetate, borate and chloride, replacing an equivalent amount of the sulfate in the formula above. These anions can be introduced by replacing part of the aluminum sulfate with the equivalent amount of the alkali, alkaline earth metal or ammonium salt of the anion listed above or by other salts known by those skilled in the art.

The presence of the additional multi-valent cations and/or anions results in the formation of a product solution of improved stability and/or performance.

The solutions of the present invention contain 7-14% equivalent alumina, and more preferably 8-11%.

The invention also includes a solid product produced by drying the aqueous solution mentioned above. The general formula of the solid product is the same as that given above, except that the value of E is usually equal to 8 or less. The solid contains at least 16.6% by weight of equivalent $Al_2O_3$, and typically 24-31% $Al_2O_3$.

The dried product may be used as is, or be reconstituted prior to use by dissolving it in an appropriate amount of water. The reconstituted product can then be used in the same way as the original aqueous solution itself.

THE PROCESS

A. The Starting Materials

As mentioned above, the basic starting materials required for the process are an alkali metal silicate, an alkali metal aluminate, aluminum sulfate and preferably a weak acid, or a salt of a weak acid. With regard to the alkali metal silicate, the use of any suitable alkali metal silicate may be contemplated, although the use of sodium silicate is preferred in the context of the present invention. Similarly, with regard to the source of alkali metal aluminate, any suitable source of alkali metal aluminate can be foreseen, although sodium aluminate is the preferred product. Any alkali, alkaline earth metal or ammonium salt of a weak acid may be used as the optional ingredient, but sodium carbonate or bicarbonate is preferred.

The relative proportions and concentrations of the starting materials employed in the process are selected to provide the stated values of A, B, C, x and D in the formula of the final product. When the alkali metal of the starting materials is sodium in all cases, the usual proportions can be stated as follows:

| Starting Material | Parts by weight |
| --- | --- |
| Sodium silicate (aqueous solution-28.7% $SiO_2$) | 1-266 |
| Water | 260 |
| Sodium aluminate (aqueous solution-25.2% $Al_2O_3$) | 950-1150 |
| Aluminum sulfate (aqueous solution-8.3% $Al_2O_3$) | 5500-7000 |
| Sodium carbonate (optional) | 1-200 |

B. The Reaction Procedure

An example of a preferred reaction procedure in which sodium carbonate is used as an optional ingredient is indicated as follows.

A premixing step, in which the sodium carbonate and alkali metal silicate are mixed with water, is carried out at ambient temperature, although higher temperatures may be used, if desired.

The aqueous premix thus produced is then added to an alkali metal aluminate solution with continuous and vigorous stirring, preferably by pouring the premix solution into the center of a vortex created by rapidly stirring the aluminate solution. This step is preferably carried out at ambient temperature.

The resulting intermediate mixture is then gradually added to, or injected under pressure into, an aqueous aluminum sulfate solution under conditions of high shear mixing with cooling to keep the temperature of the mixture below about 40° C., the reaction being exothermic. During this step, the sodium carbonate reacts with the acidic aluminum sulfate to form carbon dioxide gas which escapes from the solution, although some of the carbonate may remain in the solution depending on the final pH of the mixture.

High shear mixing conditions are well known in the art and can be achieved by certain mixers, blenders or homogenizers. The fundamental definition of fluid shear rate is the velocity gradient, dv/dy which has units of reciprocal time (ft/(sec)(ft)=sec$^{-1}$) (see J. Y. Oldshue, Fluid Mixing Technology, pub. McGraw-Hill Publications Co., 1983, page 24, the disclosure of which is incorporated herein by reference). Standard high shear mixing conditions may be obtained using, for example, a Waring blender which achieves a velocity gradient exceeding 1000 sec$^{-1}$ (see, for example, T. R. Camp, Floc Volume Concentration, Jour. AWWA, 68:656–673 [1983]). Mixing conditions characterized by a velocity gradient exceeding 1000 sec$^{-1}$ are, therefore, known in the art as high shear mixing conditions. While velocity gradients as low as 1000 sec$^{-1}$ may be used at lower than ambient temperatures, it is preferable to use velocity gradients of 3000 sec$^{-1}$, or higher.

It has been found that the high shear mixing is an essential part of the process of the present invention. While not wishing to be bound by any particular theory, it is proposed that high shear mixing provides two important functions. First, it gives instantaneous high dilution of the reactants, especially the intermediate mixture of silicate and aluminate, as it is introduced into the aluminum sulfate solution. This is required to avoid local excess concentrations of the intermediate mixture, since even small local excess concentrations relative to the aluminum sulfate will result in the formation and appearance of solid gel particles. Second, the high shear mixing provides the forces needed to disintegrate any small particles of gel into a highly dispersed, and non-agglomerated form.

In practice, the high shear mixing is sufficient to produce a reactive gel and to produce a substantially transparent polynucleate basic aluminum hydroxy silicate sulfate solution.

When the mixing and reaction are complete, the reaction mixture is optionally heated to a temperature in the range of about 55°–60° C. in order to complete the reaction, and is then positively cooled to reduce the temperature to ambient within about 3 hours, and more preferably within about 1½–2 hours, to avoid hydrolysis which causes degradation of the product. Optionally, a vacuum may be applied during the heating step to accelerate the removal of excess water to ensure equivalent $Al_2O_3$ concentrations in the final product solution typically between 10.0 to 12.0% by weight.

Instead of heating and cooling the reaction mixture in this way, the mixture may simply be kept quiescent for a period of at least 6 hours, during which time the mixture continues to react and the solution clarifies.

The resulting clear solution is stable over long periods of time and may be used without further processing. However, as already mentioned above, a solid product may be formed from this solution,, if desired, by drying the solution, e.g. by spray drying (which is most preferred) while operating at an outlet temperature of preferably 124°–130° C., vacuum drying or freeze drying, preferably keeping the temperature of the solution below 110° C. at all times in order to avoid thermal decomposition of the compound.

The overall process of the invention may be carried out on either a batch or a continuous basis. In a continuous process, each raw material is fed at a specific rate to a high shear mixer (e.g. an homogenizer), resulting in a continuous production of the product solution.

An example of a suitable continuous operation is shown in the flow diagram of FIG. 1. In the illustrated system, a mixing vessel 20 is first supplied from source 21 via line 22 with an aqueous solution of sodium aluminate containing the equivalent of 25.3% by weight of $Al_2O_3$ and having an $Na_2O/Al_2O_x$ ratio of 1.25, the weight of this solution representing 13.29% by weight of the total reactants. Sodium carbonate 11 (forming 0.31% by weight of the total reactants), an aqueous solution 12 of sodium silicate containing the equivalent of 28.7% wt/wt of $SiO_2$ (1.67% by weight of the total reactants) and water 13 (3.26% by weight of total reactants) are added to a mixing vessel 14 and the resulting aqueous premix is transferred via line 15 to the second mixing vessel 20. The premix and aluminate solution are thoroughly mixed in mixer 20 and the resulting alkaline intermediate mixture (representing a total of 18.53% by weight of the total reactants) is transferred via line 23 at a flow rate of 12.4 Kg/min to a high shear mixing apparatus indicated generally by reference numeral 25, and described in more detail below with reference to FIG. 2. An aqueous solution of aluminum sulfate containing the equivalent of 8.3% by weight of $Al_2O_3$ and cooled to a temperature of 15°–25° C. from source 26 is also supplied to high shear mixing apparatus 25 via line 27 at a flow rate of 54.6 kg/min, representing 81.47% by weight of the total reactants. The product solution, following high shear mixing, flows from the high shear mixing apparatus at a rate of 67 kg/min via line 28 to product tank 29, where it is maintained for a period of 24 hours before further handling and/or use.

The high shear mixing apparatus 25 is shown in more detail in FIG. 2. The illustrated apparatus comprises an elongated vertical recirculation column 30 for holding aluminum sulfate solution (at the start up of the process) and for accumulating the aqueous product of the invention as the process is carried out. The column has a jacket 31 covering most of its exterior surface, the jacket being supplied with cooling water via outlet 32 and inlet 33 when it is desired to keep the temperature of the contents of the column below about 40° C. The column has a lower outlet 34 connected to a pipe 35 (preferably a 3 inch diameter pipe) leading to an homogenizer 36 operated by an electric motor 37 (for example, a 6 inch tandem shear Gifford-Wood pipeline mixer having a maximum velocity gradient of 199,200 sec$^{-1}$, sold by Greerco Corporation, Hudson, N.H., USA). The mixer-homogenizer 36 subjects the liquid from pipe 35 to high shear mixing and returns the liquid to column 30 via recirculation pipe 38 (preferably also a 3 inch diameter pipe), which passes into the interior of the column 30, extends coaxially downwardly for a distance as shown, and has an outlet 39 spaced a short distance (e.g. 8 inches) from the outlet 34 of the column 30. As a result, much of the outflow from pipe 38 enters pipe 35 through column outlet 34 and is recirculated, but some accumulates in the interior of the column 30.

Pipe 35 includes a first inlet 40 (preferably positioned about 6 inches upstream of the homogenizer) for the injection of the intermediate solution from line 23 and a second inlet 41 for injection of an aluminum sulfate solution from line 27 (see FIG. 1). These inlets are positioned close to the homogenizer 36 so that the injected solutions are drawn into the homogenizer virtually instantaneously. The injected solutions and the solution withdrawn from column 30 are then rapidly mixed under high shear conditions by homogenizer 36. The product solution, which accumulates in column 30 overflows from the column via finished product outlet 43 connected to line 28. The cooling water passed through the jacket 31 keeps the temperature of the product solution below 40° C. as the mixing proceeds, as indicated above.

Figure 3:
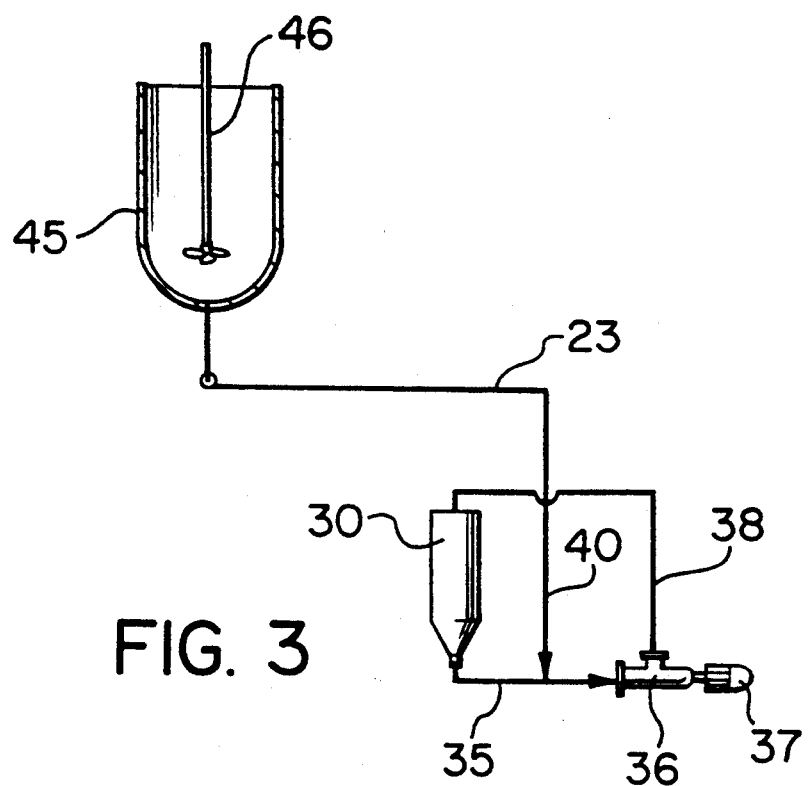
FIG. 3 is a flow diagram illustrating a preferred batch process according to the present invention.

An alternative process for carrying out the invention on a batch-wise basis is illustrated with reference to FIG. 3 and is explained below. It should be noted that some of the equipment shown in FIG. 3 is the same as, or equivalent to, that shown in FIG. 2 and, in such cases, the same reference numerals are used for simplicity and convenience.

A pre-mix of sodium carbonate and sodium silicate is first prepared in a vessel (not shown) by adding to 260 kg of water with stirring, between 1 and 200 kg, preferably 25 kg, of sodium carbonate, and between 1 and 266, preferably 133 kg, of sodium silicate solution (containing the equivalent of 28.7% $SiO_2$ and having a $SiO_2$:$Na_2O$ ratio of 3.22:1.0).

Between 950 and 1150, preferably 1060 kg, of sodium aluminate solution (containing the equivalent of 25.2% by weight of $Al_2O_3$) is added to a 500 U.S. gallon size stainless steel vessel 45 equipped with a stirrer 46. Then, with stirring, the premix of sodium silicate and sodium carbonate is poured into the vortex created by the stirrer 46, thereby creating a suspension or solution, referred to as the intermediate mixture, containing the equivalent of preferably 18% by weight of $Al_2O_3$, which is clear in appearance.

Aluminum sulfate solution (containing the equivalent of 8.3% $Al_2O_3$) between 5,500 and 7,000 kg, preferably 6,497 kg, is added to a 2,000 U.S. gallon size stainless steel reactor 30, having a design similar to that of column 30 of FIG. 2, equipped with heating and cooling jacket and a 68 rpm stirrer (not shown) and the contents of the reactor are homogenized by an homogenizer 36 of the type mentioned above (temporarily using the homogenizer as a recirculating pump). For the recirculation, the contents of the reactor 30 are withdrawn from the bottom of the tank through a 3 inch diameter pipe 35, while the discharge from the homogenizer is through a 6 inch diameter pipe which returns the outflow of the top of the reactor via pipe 38. With the recirculation established, and cooling liquid circulating through the heating/cooling jacket, a total of between 952 and 1,516 kg, preferably 1,478 kg, of the intermediate mixture (containing the equivalent of approximately 18.1% by weight of $Al_2O_3$) is added from tank 45 through an injection point 40 located in the three inch diameter inlet pipe 35, approximately 6 inches before the homogenizer 36. The rate of injection is so adjusted that between ½ to 3 hours, preferably about 1¾ hour, is required to add the total amount of the intermediate mixture, and the rate of cooling is so adjusted that the temperature of the mixture does not exceed 40° C., and preferably does not exceed 38° C.

Once the addition is complete, the recirculation is then stopped, and the stirrer kept in operation. The contents of the reactor are then heated to 55°-60° C. by passing steam through the heating/cooling jacket. The heating rate is adjusted so that between ¼ to 1 hour, preferably about 1½ hours, is required to reach 55°-60° C. The contents of the tank are then cooled by circulating cooling liquid through the heating/cooling jacket, the rate of cooling being adjusted so that between ½ to 3, preferably about 1½ hours, is required to return the contents of the tank to less than 30° C. The contents of the tank are then ready for shipment and for use.

An as alternative to the heating and cooling step described above, the product may be transferred to a storage tank after the addition of the intermediate mixture has been completed. The temperature of the solution at that time will usually be between 30°-38° C. or approximately 35° C. During the next 6-24 hours, with or without agitation, the mixture continues to react, producing a clear solution. The contents of the tank are then ready for shipment and for use.

As in the case of the product of the continuous process, the product solution may be dried to remove part or all excess water and to convert the product to a solid.

The invention and its advantages are described in more detail below with reference to the following Examples, which are provided for illustration and should not be construed as limiting the scope of the invention.

In the following Examples, the product of the previous process (identified as PASS 8.3) was in all cases prepared in accordance with Example 1 (Column 5) of U.S. Pat. No. 4,981,675. The product of the present invention (identified as PASS 100) was in all cases produced by the batch process described above using the stated preferred amounts of starting materials.

EXAMPLE 1

A laboratory comparison of the effectiveness of the product of the present invention (identified as PASS 100) and a product made according to the prior patents (identified as PASS 8.3) for the treatment of raw water is shown in Table 1 below.

TABLE 1

| RAW WATER CHARACTERISTICS | |
|---|---|
| source of raw water | Bulstrod River Victoriaville (QC) |
| pH | 7.65 |
| alkalinity (CaCO3) | 92 |
| turbidity (NTU) | 7.6 |
| temp. at beginning °C. | 26 |
| temp. at the end °C. | 26 |
| PROCEDURE | |
| Mixing at 100 RPM (min.) | 1 |
| Mixing at 25 RPM (min.) | 15 |
| Mixing at 15 RPM (min.) | 10 |
| Settling (min.) | 10 |

| RESULTS | | |
|---|---|---|
| Dosage | | Result Turbidity |
| μl/l | mgAl2O3/L | NTU |
| PASS 8.3 | | |
| 35 | 3.7 | 0.6 |
| 40 | 4.2 | 0.6 |
| 45 | 4.7 | 0.5 |
| 50 | 5.2 | 0.8 |
| 55 | 5.7 | 0.4 |
| 60 | 6.3 | 0.4 |
| 65 | 6.8 | 0.4 |
| 70 | 7.3 | 0.3 |
| PASS 100 | | |
| 25 | 3.2 | 0.5 |
| 30 | 3.8 | 0.4 |
| 35 | 4.4 | 0.3 |
| 40 | 5.1 | 0.3 |
| 45 | 5.7 | 0.2 |
| 50 | 6.4 | 0.2 |
| 55 | 7.0 | 0.2 |

TABLE 1-continued

| 60 | 7.6 | 0.2 |
|---|---|---|

These results show that, under similar conditions of pH, alkalinity, turbidity and temperature of the raw water to be treated, PASS 100 at equivalent dosages of mg $Al_2O_3$/l, gives a two fold or greater improvement of the clarity of the water.

EXAMPLE 2

This example compares the effectiveness of different forms of the product (PASS-100) of this invention:

1. PASS-100
This is the product of the invention in the form the solution as obtained from a batch procedure.
2. PASS-100 R.S.D.
The PASS-100 solution as obtained was spray dried and the spray dried product was reconstituted.
3. PASS-100 B.C.
The sodium carbonate used to produce PASS-100 was replaced by twice the molar quantity of sodium bicarbonate.
4. PASS-100 C.P.
This is a product made from the same components as PASS-100, but using a continuous process rather than a batch process.

TABLE 2

| Raw Water Characteristics | |
|---|---|
| Source of raw water- Ottawa River at Deux-Montagnes (Quebec) | |
| pH | 7.8 |
| Alkalinity (CaCO3) | 30 mg |
| Turbidity (NTU) | 7.6 |
| Temperature at the beginning °C. | 19.6 |
| Temperature at the end °C. | 20.8 |
| PROCEDURE | |
| Mixing at 100 rpm (min.) | 1 |
| Mixing at 25 rpm (min.) | 15 |
| Mixing at 10 rpm (min.) | 10 |
| Settling (min.) | 10 |

| RESULTS | Dosage Mg/L $Al_2O_3$ | Results Turbidity (NTU) |
|---|---|---|
| PASS-100 | 6.03 | 0.32 |
| PASS-100 R.S.D. | 6.05 | 0.30 |
| PASS-100 B.C. | 6.03 | 0.29 |
| PASS-100 C.P. | 6.03 | 0.27 |

These results show that, under similar conditions of pH, alkalinity, turbidity and temperature of the raw water to be treated, the PASS-100 B.C. and PASS-100 C.P. performed slightly better than PASS-100 for turbidity reduction.

The reconstituted PASS-100 R.S.D. results show the spray drying of PASS-100 did not diminish the effectiveness of the product.

Also noted was the slower floc formation with the product PASS-100 B.C. The PASS-100 C.P. gave the best all around results in providing good floc formation, the fastest settling, and the best turbidity reduction.

EXAMPLE 3

Trials carried out on River Thames water collected at Marlow, Buckinghamshire, England.

| pH | 7.76 |
|---|---|
| Turbidity | 2.7 ntu |
| Colour | 20/30° Hazen |
| Temperature | 8° C. |
| Hardness | 300 mg CaCO3/l |
| Alkalinity | 180 mg CaCO3/l |

The coagulant was flash mixed into the raw water, which was then stirred slowly for 15 minutes. The settled turbidity readings were taken after the flocs had been allowed to settle for 10 minutes.

Compared to alum both PASS 100 ($Al_2O_3$ 100%) and reconstituted PASS (spray dried - reconstituted to 8.1% $Al_2O_3$) gave larger flocs, less turbid water and lower residual aluminum levels.

Reconstituted PASS (8.1% $Al_2O_3$) gave marginally better residual aluminum and lower turbidities.

The results are shown in Table 3 for PASS 100, Table 4 for reconstituted spray dried PASS, and Table 5 for Alum.

The meaning of the floc size descriptions shown in the tables are as follows:

| A = | 0.3–0.5 | mm |
|---|---|---|
| B = | 0.5–0.75 | mm |
| C = | 0.75–1.0 | mm |
| D = | 1.0–1.5 | mm |
| E = | 1.5–2.25 | mm |

TABLE 3

PASS-100 (10% $Al_2O_3$)

| COAGULANT: | | | | | | |
|---|---|---|---|---|---|---|
| Jar Number | 1 | 2 | 3 | 4 | 5 | 6 |
| Coagulant mg/l | 2.5 | 3 | 3.5 | 4 | 4.5 | 5 |
| Floc Size after | | | | | | |
| 5 min | A | A | A | A | A | A/B |
| 10 min | A/B | B | C/D | C/D | D | D |
| 15 min | B | C | D | D | D | D/E |
| pH | 7.60 | 7.58 | 7.55 | 7.50 | 7.45 | 7.38 |
| Turbidity (ntu): | | | | | | |
| Settled | 1.2 | 0.90 | 0.77 | 0.73 | 0.94 | 0.86 |
| Filtered | 0.70 | 0.73 | 0.61 | 0.38 | 0.40 | 0.34 |
| Color (° Hazen) | <5 | <5 | <5 | <5 | <5 | <5 |
| Residual Al (µg/l) | 130 | 80 | 60 | 60 | 40 | 60 |

TABLE 4

PASS-100 RECONSTITUTED SPRAY DRIED (8.1% $Al_2O_3$)

| COAGULANT: | | | | | | |
|---|---|---|---|---|---|---|
| Jar Number | 1 | 2 | 3 | 4 | 5 | 6 |
| Coagulant mg/l | 2.5 | 3 | 3.5 | 4 | 4.5 | 5 |
| Floc Size after | | | | | | |
| 5 min | A | A | A | A | A | A |
| 10 min | A/B | B/C | C | C/D | D | D |
| 15 min | B/C | B/C | C/D | C-E | D/E | D/E |
| pH | 7.54 | 7.47 | 7.43 | 7.39 | 7.36 | 7.34 |
| Turbidity (ntu): | | | | | | |
| Settled | 0.83 | 0.82 | 0.65 | 0.63 | 0.62 | 0.64 |
| Filtered | 0.33 | 0.36 | 0.48 | 0.42 | 0.34 | 0.37 |
| Color (° Hazen) | <5 | <5 | <5 | <5 | <5 | <5 |
| Residual Al (µg/l) | 60 | 40 | 60 | 30 | 40 | 40 |

TABLE 5

ALUMINUM SULFATE 8% $Al_2O_3$

| COAGULANT: | | | | | | |
|---|---|---|---|---|---|---|
| Jar Number | 1 | 2 | 3 | 4 | 5 | 6 |
| Coagulant mg/l | 2.5 | 3 | 3.5 | 4 | 4.5 | 5 |
| Floc Size after | | | | | | |
| 5 min | A | A | A | A | A | A |

TABLE 5-continued
ALUMINUM SULFATE 8% $Al_2O_3$

| COAGULANT: | | | | | | |
|---|---|---|---|---|---|---|
| 10 min | A | A | A | B | B | C |
| 15 min | A | A/B | A/B | C | C/D | C/D |
| pH | 7.32 | 7.23 | 7.20 | 7.13 | 7.07 | 7.04 |
| Turbidity (ntu): | | | | | | |
| Settled | 1.5 | 1.8 | 1.6 | 1.3 | 1.5 | 1.2 |
| Filtered | 0.49 | 0.41 | 0.35 | 0.43 | 0.44 | 0.37 |
| Color (° Hazen) | <5 | <5 | <5 | <5 | <5 | <5 |
| Residual Al (μg/l) | 70 | 80 | 100 | 70 | 60 | 20 |

EXAMPLE 4

For this Example, a Buchi 190 Mini Spray Drier (Trademark) was used (dimensions are 50×60×100 cm). By the use of an inlet temperature of 220° C. and an outlet temperature of 115°–125° C., a white flour like material was obtained on spray drying undiluted PASS-100.

On heating a sample for 2 hours at 110° C., the weight loss (i.e. moisture content) was found to be 1.5%.

A sample of spray dried PASS-100 was redissolved in tap water in a beaker such that a 8.2% $Al_2O_3$ solution was achieved. The temperature was found to rise from 17° to 37° C. The mixture was stirred and after 40 minutes no solid material was left on the bottom of the beaker. After 1½ hours stirring the almost clear solution was filtered (mesh=1.2 μm). The weight of undissolved material was found to be 0.8%. A sample of the filtrate was analyzed and it was confirmed that the $Al_2O_3$ concentration was 8.2%.

It is to be noted that the rate of reaction between spray dried PASS 100 and water is temperature dependent. For a water temperature of 4° C., which rose to 16.5° C. on the addition of spray dried PASS 100, the time till no solid material was observable on the bottom of the beaker was much longer than indicated above.

It has been found that the product of the invention is particularly suitable for dewatering plant material containing water and plant juices, e.g. sugar beet pulp which has had the sugar leached out with water. Conventionally, the remaining pulp is dewatered by pressing, dried and used for animal feed. In the past, aluminum sulfate has been sprayed onto the leached beet pulp prior to pressing to obtain a product containing lower amounts of water prior to the drying step. The product of the present invention, when used in this way, can lead to an even drier pressed pulp and thus make the drying step shorter and/or more economical.

The product of this invention can also be used in the pulp and paper industry. In particular, it has been found that it can be used as a replacement for alum (aluminum sulfate) used as a draining-retention aid in acidic paper making processes. However, it has now quite unexpectedly been found that the product of the invention can also be used as a draining-retention aid and size promoter in neutral and alkaline paper making processes, even though alum itself cannot be used in such processes.

What we claim is:

1. A process for producing a family of stable polynucleate silicate-containing compounds which comprises mixing a silicate into an alkaline reactant to form an alkaline premix and then introducing said alkaline premix into an acidic component under high shear conditions to thereby form a stable polynucleate product containing silicate.

2. A process for producing polynucleate basic aluminum hydroxy silicate sulfates having an average chemical composition indicated by the formula:

$$Al_4(OH)_B(SO_4)_C(SiO_x)_D(H_2O)_E$$

wherein:
A is the number 1.0;
B is a number from 0.75 to 2.0;
C is a number from 0.30 to 1.12;
D is a number from 0.005 to 0.1;
x is a number greater than 2 but less than or equal to 4, such that 3=B+2C+2D (x−2); and
E is a number greater than 8 for products in solution form and less than 8 for products in solid form;
said polynucleate compounds having a basicity defined by B/3A×100 in the range of 25–66%;
with the provisos that up to 10 molar % of the amount of Al indicated in the above formula may be replaced by an equivalent amount of another multi-valent cation and up to 10 molar % of the amount of sulfate indicated in the above formula may be replaced by another anion, and that the solution may also contain up to 10 molar % of a weak acid or a salt thereof;
which process comprises:
mixing an alkali metal silicate and an alkali metal aluminate in water to form an alkaline intermediate mixture; and
adding the alkaline intermediate mixture to an acidic aluminum sulfate solution under high shear mixing conditions to form a stable solution;
the relative amounts of said alkali metal silicate, said alkali metal aluminate and said aluminum sulfate being such that said values of A, B, C and D in the formula above are satisfied.

3. A process according to claim 2 wherein up to 10 molar % of the aluminum and/or the sulfate may be replaced by replacing up to 10 molar % of the aluminum sulfate required to form the said valves A and C by an equivalent amount of at least one water-soluble compound containing ions selected from the group consisting of a multi-valent cation other than aluminum, an anion other than sulfate and both of said multi-valent cation and said anion.

4. A process according to claim 3 wherein up to 10 molar % of a weak acid or a salt thereof is included in at least one of said intermediate mixture, said aluminum sulfate solution and said aqueous polynucleate hydroxy aluminum silicate sulfate solution.

5. A process according to claim 4 wherein said weak acid or salt thereof is present in at least one of said intermediate mixture and said aluminum sulfate solution during said addition of said intermediate mixture to said aluminum sulfate solution.

6. A process according to claim 5 wherein said weak acid is selected from weak organic and inorganic acids and the salts thereof are selected from the group consisting of alkali metal, alkaline earth metal and ammonium salts.

7. A process according to claim 5 wherein said salt of said weak acid is sodium carbonate or bicarbonate.

8. A process according to claim 3 wherein said at least one multi-valent cation is selected from the group consisting of iron, magnesium, calcium, zinc and zirconium.

9. A process according to claim 3 wherein said at least one additional anion is selected from the group consisting of phosphate, acetate, borate, chloride, bicarbonate and carbonate.

10. A process according to claim 2 wherein sodium carbonate followed by sodium silicate is added to water to form a premix, said premix is added to sodium aluminate solution to form an intermediate mixture and, under high shear mixing conditions, said intermediate mixture is injected into said aluminum sulfate solution.

11. A process according to claim 2 wherein sodium silicate followed by sodium carbonate are added to water to form a premix, the premix is added to sodium aluminate solution to form an intermediate mixture and, under high shear mixing conditions, said intermediate mixture is injected into said aluminum sulfate solution.

12. A process according to claim 2 wherein sodium silicate is added to water and the resulting solution is added to sodium aluminate solution to form an intermediate mixture, sodium carbonate is added to said aluminum sulfate solution and, under high shear mixing conditions, said intermediate mixture is injected into said aluminum sulfate solution.

13. A process according to claim 2 wherein sodium silicate is added to water and the resulting solution is added to sodium aluminate solution to form an intermediate mixture and, under high shear mixing conditions, the intermediate mixture is injected into said aluminum sulfate solution, and then sodium carbonate is added thereto.

14. A process according to claim 2 wherein sodium silicate is added to water and the resulting solution is added to sodium aluminate solution to form an intermediate mixture under high shear mixing conditions and the intermediate mixture is injected into said aluminum sulfate solution.

15. A process according to claim 2 wherein sodium silicate is added to water, the resulting solution is added to sodium aluminate solution to form an intermediate mixture, sodium carbonate is added to said mixture and then, under high shear mixing conditions, said intermediate mixture is injected into said aluminum sulfate solution.

16. A process according to claim 2 wherein, during said addition of said intermediate mixture to said aluminum sulfate solution, the temperature of the resulting mixture is maintained below about 40° C.

17. A process according to claim 2 wherein, following said addition of said intermediate mixture to said aluminum sulfate solution, the temperature of the mixture is raised to about 55°-60° C. and then the mixture is cooled in less than about 3 hours to below 30° C.

18. A process according to claim 2 wherein, following said addition of said intermediate mixture to said aluminum sulfate solution, the resulting mixture is allowed to stand for a period of at least about 6 hours prior to further use.

19. A process according to claim 2 for producing a solution of said compound in which:

| | |
|---|---|
| B = | 1.2–1.8 |
| C = | 0.53–0.90 |
| D = | 0.033–0.070 |
| $x \leq 3$. | |

20. A process according to claim 2 wherein said solution has an equivalent content of $Al_2O_3$ of up to 11% by weight.

21. A process according to claim 3 wherein said solution has an equivalent content of $Al_2O_3$ of up to 11% by weight.

22. A process according to claim 4 wherein said solution has an equivalent content of $Al_2O_3$ of up to 11% by weight.

23. A process according to claim 2 wherein starting materials for said process are used in the following relative proportions:

| Starting Material | Parts by weight |
|---|---|
| Sodium silicate (aqueous solution-28.7% $SiO_2$) | 2–266 |
| Water (for premix) | 260 |
| Sodium aluminate (aqueous solution-25.2% $Al_2O_3$) | 950–1150 |
| Aluminum sulfate (aqueous solution-8.3% $Al_2O_3$) | 5500–7000 |
| Sodium carbonate | 1–200 |

* * * * *